United States Patent [19]
Bergelin et al.

[11] Patent Number: 5,195,322
[45] Date of Patent: Mar. 23, 1993

[54] VALVE SEAL FOR A MASTER CYLINDER

[75] Inventors: Klaus Bergelin, Niedernhausen; Harald Koenig, Ober-Moerlen; Bernhard Hammes, Hattersheim, all of Fed. Rep. of Germany

[73] Assignee: Alfred Teves GmbH, Frankfurt am Main, Fed. Rep. of Germany

[21] Appl. No.: 804,880

[22] Filed: Dec. 6, 1991

[30] Foreign Application Priority Data

Dec. 17, 1990 [DE] Fed. Rep. of Germany ....... 4040271

[51] Int. Cl.[5] .............................................. B60T 11/28
[52] U.S. Cl. ........................................ 60/589; 60/592; 251/359
[58] Field of Search .................. 60/572, 586, 587, 589, 60/592; 91/422, 222; 251/359, 321

[56] References Cited

U.S. PATENT DOCUMENTS

| 4,147,824 | 4/1979 | Dettmann et al. | 92/103 SD |
| 4,753,075 | 6/1988 | Nomura et al. | 60/589 |
| 4,888,952 | 12/1989 | Zirps | 60/592 |
| 4,997,009 | 3/1991 | Niikura et al. | 60/413 |

OTHER PUBLICATIONS

Metals Handbook, vol. 5, Ninth Ed, pp. 150–154, 1982.
Tool Engineers Handbook, First Ed, p. 1564, 1949.

*Primary Examiner*—Edward K. Look
*Assistant Examiner*—F. Daniel Lopez
*Attorney, Agent, or Firm*—Robert P. Seitter; J. Gordon Lewis

[57] ABSTRACT

The present inventive relates to a master cylinder (1) with elastomeric central valves (20) which can be opened in opposition to a relatively high pressure in the pressure chambers (8 and 9) without damage. The sealing face (29) of the valve member (26) is in the form of a hollow cylinder protruding slightly from the broad head portion (24) of the valve pin (21). The valve member sealing face does not, as has been conventional practice, extend radially inwardly past the head portion (24) in the direction of the central bore (13) to avoid being drawn into the bore (13).

4 Claims, 1 Drawing Sheet

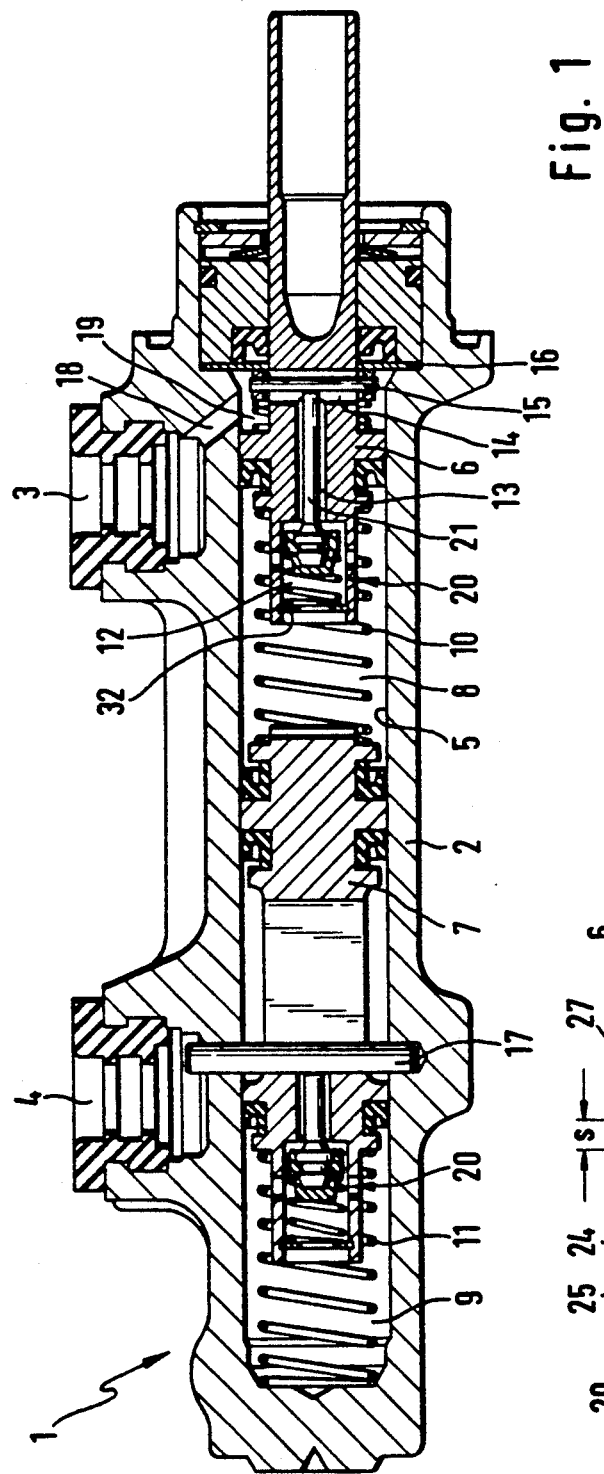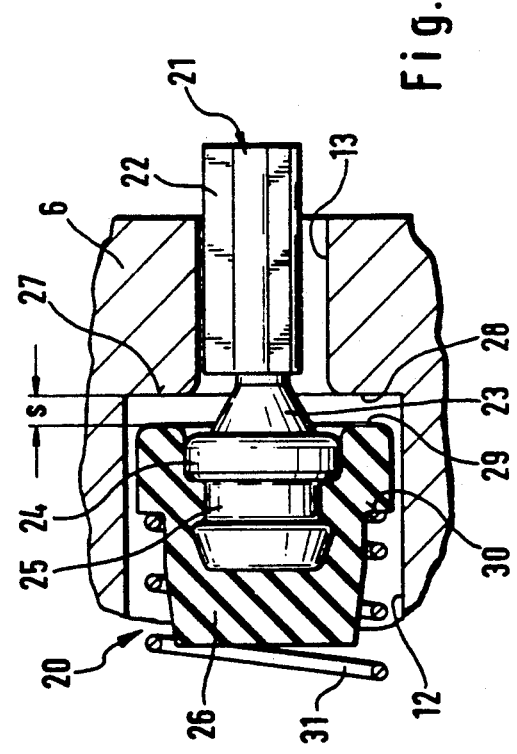

VALVE SEAL FOR A MASTER CYLINDER

BACKGROUND OF THE INVENTION

The present invention relates to a master cylinder for a hydraulic brake system of an automotive vehicle. Such master cylinders have included a housing, formed with a bore of which at least one piston is axially slidably guided in a sealed manner, the piston defining a pressure chamber in the master cylinder housing. At least one connection to an unpressurized supply reservoir is provided, comprising a central valve which controls the pressure fluid flow between a supply reservoir and the pressure chamber in dependence on the piston position. The central valve is composed of a sealing seat integrated in the piston, a valve pin penetrating a central bore of the piston and cooperating with a stop on the housing, a valve spring mounted on the piston and urging a valve member in the direction of the sealing seat. The valve member has been known to be made of elastomeric material and anchored in a groove in the valve pin.

Master cylinders with elastomeric central valves of this type are known in practice and described in many patent specifications (see for instance DE 38 35 396 A1 or DE 37 15 209 A1).

However, the valve member in the known arrangements extends radially inwardly over the valve pin in the area of the sealing seat. Admittedly, secure retention of the valve member on the valve pin together with the groove on the valve pin is known from DE 37 15 209 A1, but this construction has the shortcoming that the valve member is drawn into the central bore when the central valve is opened mechanically in opposition to a residual pressure in the pressure chamber. This can cause damage to the sealing lip of the valve member and failure of the brake circuit after relatively few cycles.

To remedy this shortcoming it is known to use steel ball central valves, but these are very susceptible to dirt. Another approach is to design the rubber part of the central valve as a sealing seat in the piston. The latter design involves increased structural complexity.

Therefore, the present invention the object to provide a master cylinder whose central valve can be opened in opposition to a residual pressure of roughly 80 bar (at present roughly 50 bar are usual) without damage, which is straightforward in its design and allows low-cost manufacture.

SUMMARY OF THE INVENTION

This object is achieved in a surprisingly simple fashion in that the sealing portion of the valve member is shaped as the end face of a cylindrical ring overlying the broad head portion of the valve pin, without a lip portion extending radially inwardly in the direction of the central bore. The risk that any part of the valve member will be sucked into the seat and thereby sheared off is thereby reduced to a minimum.

This risk is further minimized by a conical design of the transition area at the valve pin to avoid excessive deformation of the valve member which could occur when ribs on the guide portion of the valve pin extend up to the head of the valve pin.

According to the preferred embodiment of the invention, the edges of the central bore, the valve pin and the valve member are rounded, which contributes to preserving the delicate rubber sealing part of the valve member.

Another feature is that the Shore-hardness of the material of which the valve member is made amounts to 80°±5°. This harder material is less elastic and hence resists being pressed into the central bore.

Further, it is advantageous when the central bore has a diameter of roughly 4.3 mm. This enlarging by about 10% of the diameter from 3.9 mm, typical according to conventional practice, has as a result that the pressure balance between pressure chamber and supply reservoir is effected in a shorter time and so that the load on the sealing lip is reduced more quickly.

The manufacturing effort needed for the master cylinder according to this invention can be reduced further in a simple fashion when the valve member is furnished with a step on which the valve spring is engaged.

DESCRIPTION OF THE DRAWINGS

FIG. 1 is an axial, partially cross-sectional view of a tandem master cylinder with two central valves according to this invention; and FIG. 2 is a fragmentary, enlarged, and partially sectional view of a central valve according to the present invention, the valve pin slightly different from that shown FIG. 1.

DETAILED DESCRIPTION

Only those component parts of the master cylinder illustrated in the drawing will be described herein which are pertinent to the invention, since master cylinders of this type represent the general state of the art, and their function is well known. Like parts have been assigned like reference numerals in both Figures.

FIG. 1 depicts a tandem master cylinder 1 with a housing 2 furnished with two connections 3, 4 for a non-illustrated supply reservoir and a bore 5. In bore 5, two pistons 6, 7 are arranged in series which, in conjunction with it, confine two pressure chamber 8, 9. Accommodated in each pressure chamber 8, 9 is a spring 10, 11 which biases the associated piston 6, 7 to the right in the inactive position. Since both pistons 6, 7 basically are of like design, only the push rod piston 6 will be described in the following. Piston 6 has a recess 12 at its left-hand end, from which extends a central bore 13, in turn connected to a transverse bore 14. Extending through the transverse bore 14 is a stop pin 15 which abuts on a disc 16 fixed to the housing 2 in the inactive position. Pin 17 performs the same function in the piston 7.

A channel 18 extends from the fitting 3 into an annular chamber 19 which is in communication with the transverse bore 14. Thus a hydraulic connection is established from the pressure chamber 8 through the recess 12, past a central valve 20 in the recess 12 and through the central bore 13, the transverse bore 14 and the annular chamber 19 via the channel 18 to the supply reservoir in the inactive position of the piston 6 shown in FIG. 1.

The central valve 20 is illustrated on an enlarged scale in FIG. 2, which is slightly different from the form shown in FIG. 1. The central valve 20 has a valve pin 21 which is guided in the central bore 13, and has three longitudinal ribs 22, each offset by 120° in relation to one another. It is of circular cross-section and is guided with clearance in the central bore in FIG. 1. The valve pin 21 has a larger conical transition area 23 interposed between the end of the ribs 22 and a succeeding broad head portion 24 located within the recess 12.

The conical transition area 23 prevents excessive deformation of a molded valve member 26 which would otherwise occur if the ribs 22 extended to the head portion 24.

The broad, radially enlarged head portion 24 is furnished with a groove 25 into which a correspondingly shaped part of the valve member 26 is molded. The sealing seat 27 is sized to seat against the sealing face 29 of the piston 6 valve member 26, sealing seat 27 forming the right-hand end of the recess 12. The transition from the seat 27 to the central bore 13 is rounded. The sealing face 29 of the valve member 26, which cooperates with the sealing seat 27, protrudes somewhat from the broad head portion 24 of the valve pin 21 in an axial direction towards the sealing seat 27. It is spaced by the lost travel "s" from the sealing seat 27 in the inactive position. The annular edges of the valve member 26 adjacent the sealing face 29 are rounded with a substantial radius.

The annular edge of the broad head 24 of the valve pin 21 adjacent the sealing face 29 is also rounded with a substantial radius, as shown in FIG. 2. This rounding of the edges preserves the delicate sealing face 29 of the valve member 26.

Further, a step 30 is shaped at the valve member 26, against which step an end of the valve spring 31 is bearing, the other end engaged against a projection, comprised of a circlip 32 (FIG. 1) installed in the wall of the recess 12.

The function of the master cylinder described above is known per se, i.e., at the beginning of the actuation, the valve spring 31 presses the valve member 26 against the sealing seat 27, and the valve pin 21 will lift from the pin 15 or 17, respectively, after displacement equal to the extent lost travel "s", and pressure build-up commences in the pressure chambers 8 and 9, respectively.

At the end of the braking operation, the springs 10 and 11 will urge the pistons 6 and 7 to the right again. The valve pins 21 move into abutment on the pins 15 and 17 and open the central valves 20 mechanically. Frequently this is done after an anti-lock control action was performed during braking, while still relatively high pressures are prevailing in the pressure chambers 8 and 9. These pressures result since the pump delivers fluid into the pressure chambers 8 and 9 during the control action and additional pressure fluid volume is not always discharged completely via outlet valves into the supply reservoir again. Due to the pressure in the pressure chamber 8 and 9, respectively, the pressure fluid tends to flow rapidly out through the central bore 13 to the unpressurized reservoir. Since turbulences are formed in the rapid flow, there is a tendency for the lip of the prior art valve member to be drawn into the bore. The inventive sealing face 29 is shape such that it will not get into the central bore 13 and will thus not be damaged by this fluid outflow which inevitably occurs.

Therefore, the present invention permits the use of rubber central valves in anti-look brake systems wherein the central valves must frequently be opened in oppositions to residual pressure during the control operation.

Another feature is that the Shore-hardness number of the material of which the valve member is made is 80°±5°. This harder material is less elastic and hence resists being drawn into the central bore.

Further, it is advantageous when the central bore has a diameter of roughly 4.3 mm. This enlarging by about 10% of the diameter from 3.9 mm, typical according to conventional practice, has as a result that the pressure balance between pressure chamber and supply reservoir is effected in a shorter time and so that the load on the sealing face is reduced more quickly.

We claim:

1. A master cylinder for a hydraulic brake system of an automotive vehicle comprising:
   a housing having a bore;
   at least one piston having a radial face and axially slidably guided in said housing bore in a sealed manner, said piston defining a pressure chamber in the master cylinder housing bore;
   means for establishing at least one connection from said pressure chamber to an unpressurized supply reservoir;
   a longitudinal central bore formed extending from said radial face on said piston;
   central valve means which controls flow of a pressure fluid into said pressure chamber and said piston bore in dependence on said position of said piston;
   said central valve means including a sealing seat formed on a radial surface around said piston bore, a valve pin having a stem guide portion extending into said piston central bore, a fixed stop in said housing adapted to engage said valve pin stem guide portion upon a predetermined extent of movement, a radially enlarged head portion at one end of said valve pin fixed to said stem guide portion, an elastomeric valve member fixed to said valve pin head portion and adapted to seal against said sealing seat, a valve spring support on said piston and urging said valve member in the direction of said sealing seat, and said valve member including an annular end surrounding said head portion and facing said valve seat, protruding axially slightly beyond said head portion and not extending radially in past said head portion of said valve pin
   said valve pin stem guide portion having a series of ribs formed thereon, and further formed with a conical transition area interposed between said head portion and said longitudinal ribs on said stem guide portion.

2. A master cylinder for a hydraulic brake system of an automotive vehicle comprising:
   a housing having a bore;
   at least one piston having a radial face and axially slidably guided in said housing bore in a sealed manner, said piston defining a pressure chamber in the master cylinder housing bore;
   means for establishing at least one connection from said pressure chamber to an unpressurized supply reservoir;
   a longitudinal central bore formed extending from said radial face on said piston;
   central valve means which controls flow of a pressure fluid into said pressure chamber and said piston bore in dependence on said position of said piston;
   said central valve means including a sealing seat formed on a radial surface around said piston bore, a valve pin having a stem guide portion extending into said piston central bore, a fixed stop in said housing adapted to engage said valve pin stem guide portion upon a predetermined extent of movement, a radially enlarged head portion at one end of said valve pin fixed to said stem guide portion, an elastomeric valve member fixed to said valve pin head portion and adapted to seal against said sealing seat, a valve spring support on said piston and urging said valve member in the direction of said sealing seat, and said valve member including an annular end surrounding said head portion and facing said valve seat, protruding axially slightly beyond said head portion and not extending radially in past said head portion of said valve pin an edge formed around said central bore with a substantial radius;

said head portion of said valve pin formed with an annular edge adjacent the inside of said annular end of said valve member, said annular edge rounded by a substantial radius; and, said annular end of said valve member formed with an inside edge adjacent said head portion rounded edge, said inside edge rounded with a substantial radius.

3. A master cylinder as claimed in claim 2, wherein said central bore has a diameter of roughly 4.2 mm.

4. A master cylinder as claimed in claim 6, wherein said valve member is composed of an elastomeric material with a Shore-hardness number of $80° \pm °$.

* * * * *